(12) United States Patent
Wilson

(10) Patent No.: US 9,406,197 B2
(45) Date of Patent: Aug. 2, 2016

(54) FUELING GAME DEVICES, SYSTEMS, AND METHODS

(71) Applicant: Roger L. Wilson, Indianapolis, IN (US)

(72) Inventor: Roger L. Wilson, Indianapolis, IN (US)

(73) Assignee: INDYTRADECENTER IN LLC, Indianapolis, IN (US)

( * ) Notice: Subject to any disclaimer, the term of this patent is extended or adjusted under 35 U.S.C. 154(b) by 0 days.

(21) Appl. No.: 14/455,689

(22) Filed: Aug. 8, 2014

(65) Prior Publication Data

US 2015/0041019 A1 Feb. 12, 2015

Related U.S. Application Data

(60) Provisional application No. 61/863,759, filed on Aug. 8, 2013, provisional application No. 61/891,866, filed on Oct. 16, 2013.

(51) Int. Cl.
*G07F 17/32* (2006.01)
*B67D 7/04* (2010.01)
*A63F 13/40* (2014.01)
*B67D 7/22* (2010.01)

(52) U.S. Cl.
CPC ............ *G07F 17/3255* (2013.01); *A63F 13/10* (2013.01); *B67D 7/04* (2013.01); *B67D 7/227* (2013.01); *G07F 17/3295* (2013.01)

(58) Field of Classification Search
CPC ..... G07F 17/3255; G07F 7/3223; B67D 7/04; A63F 13/10
USPC ............ 141/1, 59, 94, 98, 392; 273/459–461; 463/25
See application file for complete search history.

(56) References Cited

U.S. PATENT DOCUMENTS

| | | | | |
|---|---|---|---|---|
| 3,852,576 A * | 12/1974 | Rudd | ..................... | B67D 7/222 273/460 |
| 4,501,422 A * | 2/1985 | Leshik | ................. | G07C 15/006 273/460 |
| 4,869,500 A * | 9/1989 | Williams | ................ | G07F 17/32 463/2 |
| 5,890,718 A * | 4/1999 | Byon | ..................... | G07F 13/00 222/255 |
| 6,651,706 B2 * | 11/2003 | Litt | ......................... | B67D 7/106 141/234 |
| 6,783,028 B1 * | 8/2004 | Ambrose | ............... | B67D 7/426 141/392 |
| 2002/0145039 A1 * | 10/2002 | Carroll | .................. | G07F 13/025 235/384 |
| 2004/0221920 A1 * | 11/2004 | Ferguson | ............. | B67D 7/3236 141/392 |

* cited by examiner

*Primary Examiner* — Timothy L Maust
(74) *Attorney, Agent, or Firm* — Reichel Stohry LLP; Mark C. Reichel; Natalie J. Dean

(57) ABSTRACT

A game of accuracy and method for playing the same at a fuel pump comprising one or more players dispensing fuel or energy with the object of stopping the fuel pump's metering mechanism at a predetermined value. Exemplary embodiments of the game comprise a fuel pump, a metering mechanism for measuring the quantity of fuel or energy dispensed, a controller coupled with the fuel pump for starting and stopping the flow of fuel or energy therethrough, and a processor in communication with the metering mechanism. The method of playing comprises selecting a goal outcome, one or more players dispensing fuel or energy with the object of dispensing an amount of fuel or energy that corresponds with the goal outcome, and providing the one or more players with a prize in the event the amount of fuel or energy dispensed corresponds with the goal outcome.

20 Claims, 3 Drawing Sheets

FUELING GAME DEVICES, SYSTEMS, AND METHODS

PRIORITY

The present U.S. nonprovisional patent application is related to, and claims the priority benefit of, U.S. Provisional Patent Application Ser. No. 61/863,759, filed Aug. 8, 2013, and U.S. Provisional Patent Application Ser. No. 61/891,866, filed Oct. 16, 2013, the contents of which are hereby incorporated by reference in their entirety into the present disclosure.

BACKGROUND

Conventional fuel pumps or charging stations installed at fueling or gas stations generally only comprise fuel distribution and metering functions. When refilling a tank or charging a battery, drivers and passengers typically have nothing to do but wait for the completion of the tank refilling or battery recharge. While some fuel pumps and charging stations have displays that display advertising, authorization information and/or perform commercial transactions during the refilling process, there is typically little available at the pump/station to engage the patrons' attention. Furthermore, fueling/charging stations typically earn a large portion of their revenue not from the sale of fuel, but from purchases made in the often-accompanying convenience and food stores. Aside from any advertisements displayed at the pump or charging station, or in and around the station itself, there is typically nothing to drive patrons into the convenience store. This is further exacerbated by the prevalent use of pay-at-the-pump systems that are available at most fueling and charging stations today.

BRIEF SUMMARY

In an exemplary embodiment of game system of the present disclosure, the game system comprises a fuel pump, a metering mechanism, a controller, and a processor. The fuel pump is configured to dispense fuel from a source and the metering mechanism is operable to measure the quantity of fuel dispensed by the fuel pump. The metering mechanism is further operable to display a value that corresponds with the quantity of fuel pumped. The controller is coupled with the fuel pump and operable by a player to start and stop the distribution of fuel by the fuel pump. The processor is in communication with the metering mechanism and is configured to receive and store a goal outcome and/or data from the player. In at least one embodiment, the data comprises a request by the player to enter the game. Furthermore, the goal outcome may also be supplied by the player and may comprise a monetary amount or a set volume of fuel. Alternatively, the goal outcome may be determined by a game administrator or the processor. The processor is operable to compare the goal outcome with the value displayed by the metering mechanism to determine if the player should be awarded a prize.

In an exemplary embodiment of a method for facilitating the play of a game of accuracy at a fuel pump of the present disclosure, the method comprises the steps of at least one player dispensing fuel with the object of dispensing an amount of fuel that corresponds with a goal outcome; and providing the at least one player a prize in the event the amount of fuel dispensed corresponds with the predetermined outcome.

In an exemplary embodiment of a method for facilitating the play of a game of accuracy at a fuel pump of the present disclosure, the method comprises the steps of at least one player operating a system to dispense fuel or energy with the object of dispensing a specific quantity of the fuel or energy, the system comprising a fuel pump having a metering mechanism operable to display a value corresponding to the quantity of fuel or energy dispensed from a source of the fuel or energy, a controller coupled with the fuel pump, the controller operable by the at least one player to start and stop distribution of the fuel or energy by the fuel pump, and a processor in communication with the metering mechanism, the processor operable to compare the goal outcome with the value displayed by the metering mechanism to determine of the at least one player should be awarded a prize, and providing a prize to the at least one player in the event the value corresponds with the goal outcome. In another embodiment, the goal outcome comprises a currency amount, and wherein the processor is operable to compare the currency amount with the value to determine if the prize should be awarded. In yet another embodiment, the currency amount is selected from the group consisting of a single currency value and a range of currency values.

In an exemplary embodiment of a method for facilitating the play of a game of accuracy at a fuel pump of the present disclosure, the goal outcome comprises an amount of fuel or energy, and wherein the processor is operable to compare the amount of fuel or energy with the value to determine if the prize should be awarded. In an additional embodiment, the amount of fuel or energy is selected from the group consisting of a single amount of fuel or energy and a range of amounts of fuel or energy. In yet an additional embodiment, the goal outcome is selected by the at least one player. In another embodiment, the goal outcome is not selected by the at least one player.

In an exemplary embodiment of a method for facilitating the play of a game of accuracy at a fuel pump of the present disclosure, the step of providing the prize to the at least one player is performed by assigning a point amount to the at least one player, the point amount corresponding to how closely the quantity of fuel or energy dispensed matches the goal outcome, designating at least one winning point amount corresponding to a number of points required to win the prize, and providing the prize to the at least one player in the event the point amount is equal to or greater than the at least one winning point amount. In another embodiment, the step of providing the prize is performed by printing a prize ticket and dispensing the prize ticket to the at least one player, and providing the prize to the at least one player in response to the at least one player tendering the prize ticket for redemption.

In an exemplary embodiment of a method for facilitating the play of a game of accuracy at a fuel pump of the present disclosure, the prize is selected from a group of potential prizes. In another embodiment, the group of potential prizes comprises at least one first prize having a first value and at least one second prize having a second value lower than the first value, and wherein the step of providing the prize is performed by selecting the prize from the group of potential prizes based upon how close the value is compared the goal outcome. In yet another embodiment, the method further comprises the steps of providing the at least one player a secondary objective that corresponds with a second goal outcome, and providing a second prize to the at least one player in the event the at least one player achieves the second goal outcome.

In an exemplary embodiment of a system of the present disclosure, the system comprises a fuel pump having a metering mechanism operable to display a value corresponding to a quantity of fuel or energy dispensed from a source of the fuel or energy, a controller coupled with the fuel pump, the controller operable by a player to start and stop distribution of the fuel or energy by the fuel pump, and a processor in communication with the metering mechanism, the processor operable to compare a goal outcome with the value displayed by the metering mechanism to determine if the player should be awarded a prize. In another embodiment, the processor is further configured to direct the prize to be awarded to the player, and wherein the system further comprises a device configured to provide the prize to the player. In yet another embodiment, the device is selected from the group consisting of a printer configured to print a ticket displaying the prize, a prize dispenser, and a display configured to depict the prize or data indicative of the prize.

In an exemplary embodiment of a system of the present disclosure, the system is configured to receive input from the player regarding whether the player wishes to have an opportunity to win the prize. In another embodiment, the goal outcome comprises a currency amount, and wherein the processor is operable to compare the currency amount with the value to determine if the player should be awarded the prize. In yet another embodiment, the goal outcome comprises an amount of fuel or energy, and wherein the processor is operable to compare the amount of fuel or energy with the value to determine if the player should be awarded the prize.

In an exemplary embodiment of a method for facilitating the play of a game of accuracy at a fuel pump of the present disclosure, the method comprises the steps of at least one player dispensing fuel or energy with the object of dispensing an amount of fuel or energy that corresponds with a goal outcome, and providing the at least one player a prize in the event the amount of fuel or energy dispensed corresponds with the goal outcome. In another embodiment, the method further comprises the steps of assigning a point amount to the at least one player, the point amount corresponding to how closely the amount of fuel or energy dispensed matches the goal outcome, designating at least one winning point amount corresponding to the number of points required to win the game, and providing the at least one player a prize in the event the point amount is equal to or greater than the at least one winning point amount.

In an exemplary embodiment of a method for facilitating the play of a game of accuracy at a fuel pump of the present disclosure, the step of providing the at least one player a prize further comprises the steps of responsive to the amount of fuel or energy dispensed corresponding with the goal outcome, printing the at least one player a prize ticket and providing the prize ticket to the player, and responsive to the prize ticket being tendered for redemption, providing the at least one player the prize. In another embodiment, the step of providing the at least one player a prize further comprises the steps of responsive to the point amount being equal to or greater than the at least one winning point amount, printing the at least one player a prize ticket and providing the prize ticket to the player, and responsive to the prize ticket being tendered for redemption, providing the at least one player with the prize, wherein the prize value is associated with the how close the point amount is to the at least one winning point amount. In yet another embodiment, the goal outcome is selected by the at least one player. In another embodiment, the goal outcome comprises a dollar amount or a quantity of fuel. In another embodiment, the method further comprises the steps of providing the at least one player a secondary objective that corresponds with a second goal outcome, and providing the at least one player a second prize in the event the at least one player achieves the second goal outcome. In yet another embodiment, the method further comprises the steps of responsive to the point amount having a value equal to or greater than a set value, providing the at least one player the opportunity to enter into a secondary game of chance.

In an exemplary embodiment of a game of the present disclosure, the game comprises a fuel pump configured to dispense fuel or energy from a source, a metering mechanism operable to measure the quantity of fuel or energy dispensed from the source by the fuel pump and display a value corresponding to such quantity to a player, a controller coupled with the fuel pump, the controller operable by the player to start and stop the distribution of fuel or energy by the fuel pump, and a processor in communication with the metering mechanism, the processor configured to receive and store a goal outcome and/or data from the player, and operable to compare the goal outcome with the value displayed by the metering mechanism to determine if the player should be awarded a prize. In another embodiment, the data comprises a request by the player to enter the game. In an additional embodiment, the game further comprises at least one input device in operable communication with the processor and configured to receive a goal outcome and/or data from the player. In yet an additional embodiment, the game further comprises at least one output device in operable communication with the processor and configured to display information to the player.

In an exemplary embodiment of a game mechanism of the present disclosure, the game mechanism comprises one or more components referenced herein, the game mechanism configured to facilitate awarding a prize, or consideration of a prize, to a player in connection with dispensing fuel or energy at a fuel pump.

In an exemplary embodiment of a game of the present disclosure, the game comprises one or more modified fuel pumps configured to dispense fuel or energy from a source, each modified fuel pump comprising a metering mechanism operable to measure the quantity of fuel or energy dispensed from the source by the modified fuel pump and display a value corresponding to such quantity to a player, and a controller coupled with the fuel pump, the controller operable by the player to start and stop the distribution of fuel or energy by the modified fuel pump, and a processor in communication with the metering mechanisms of each of the modified fuel pumps, the processor configured to receive and store goal outcomes and/or data from one or more players operating the modified fuel pumps, and operable to compare the goal outcomes with the associated values displayed by the respective metering mechanisms to determine if each player should be awarded a prize. In another embodiment, the game further comprises one or more unmodified fuel pumps configured to dispense fuel or energy from a source, wherein each unmodified fuel pump is not configured to communicate with the processor. In yet another embodiment, wherein each of the one or more modified fuel pumps further comprises at least one input device in operable communication with the processor and configured to receive a goal outcome and/or data from a player, and further comprising a second controller operable by a game administrator to independently activate or deactivate each input device of each modified fuel pump.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
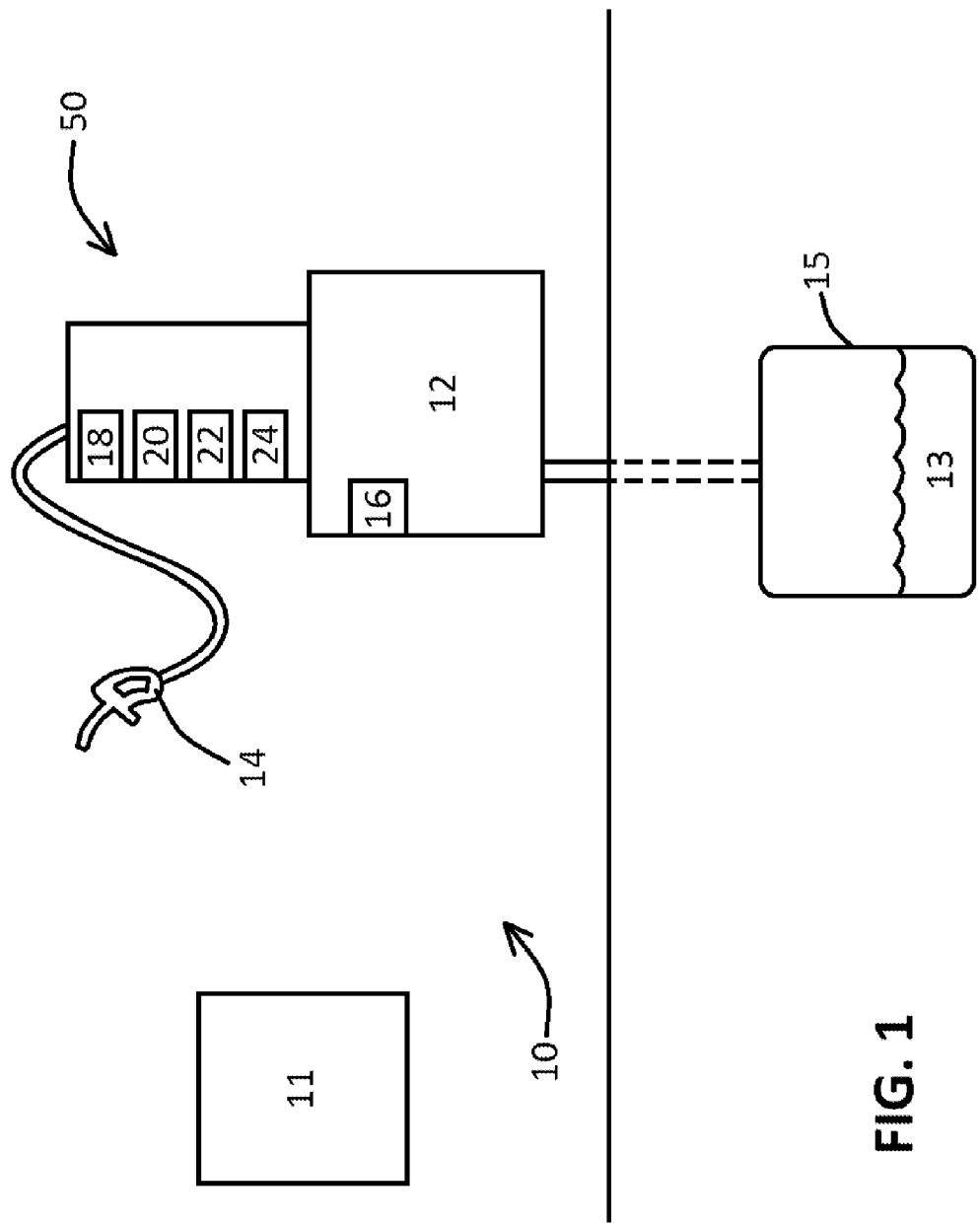
FIG. 1 shows a schematic view of a fueling station having a fuel pump configured for operation in connection with the game of accuracy according to an exemplary embodiment of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
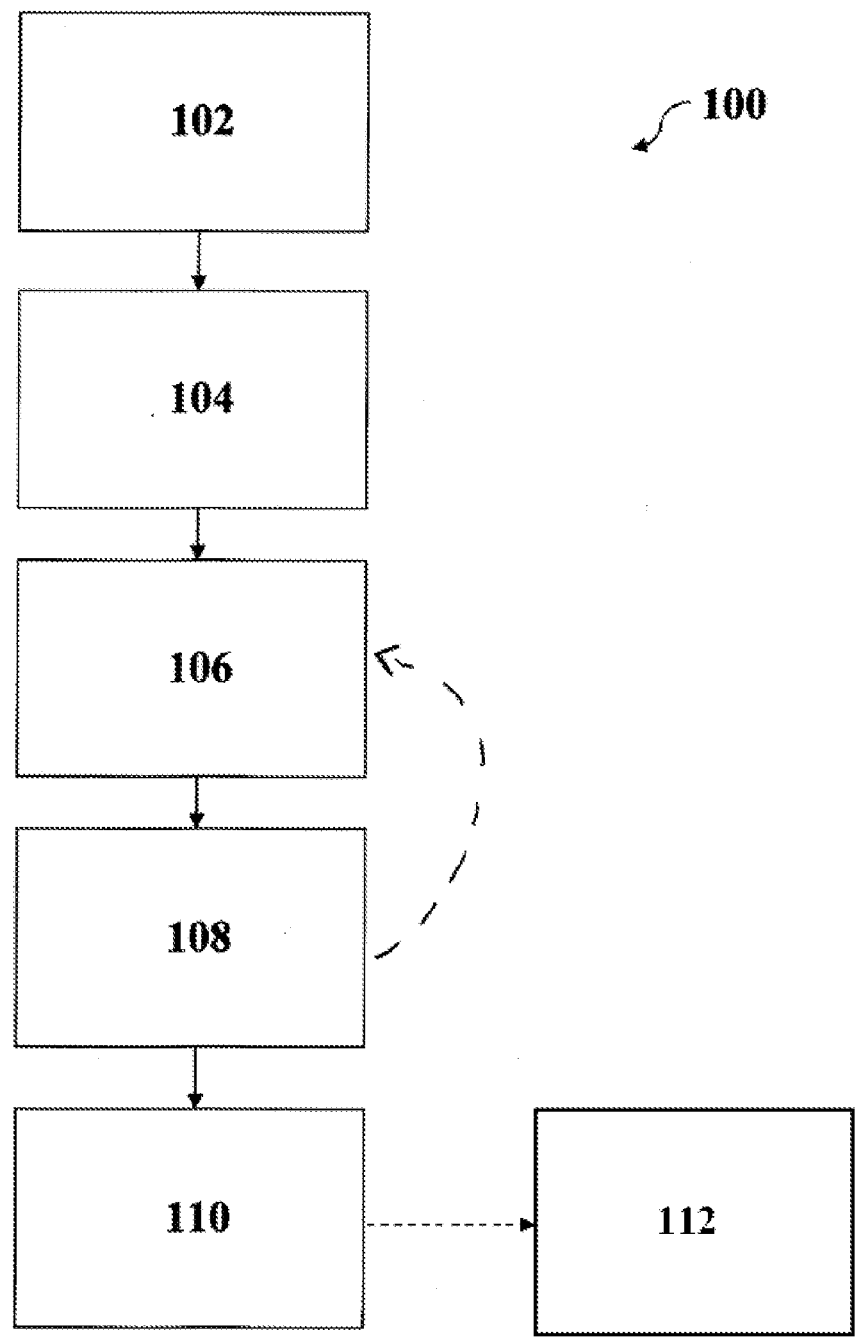
FIG. 2 shows a flow chart outlining the basic steps of a method for facilitating the play of a game of accuracy at a fuel pump according to an exemplary embodiment of the present disclosure.

Exemplary systems/games 50 and methods for facilitating the play of a game of accuracy at a fuel pump or charging station of the present disclosure is shown in FIGS. 1 and 2. FIG. 1 shows a diagram of a fueling station 10 having a fuel pump 12 configured for operation in connection with the game of accuracy described herein. It will be appreciated that the embodiments disclosed herein may be used in connection with any type of fueling/charging pump or station that is now in existence or that may otherwise be adopted in the future that enables a user to start and stop fuel, electricity, or energy flow and measures the flow of fuel and/or energy dispensed during the fueling or charging process. For example, and without limitation, in addition to fueling stations that dispense gasoline or diesel fuel, charging stations that provide electricity and/or other renewable energies may be configured for use with the game of accuracy in accordance with the embodiments disclosed herein. As such, it will be understood that any references to "fuel," "fueling," or "fuel dispensed" in this disclosure are used generally to mean and include not only conventional gasoline/diesel fueling applications, but also those fueling and charging processes associated with dispensing and/or storing electricity or other renewable energies.

Now referring to FIG. 1, when a patron desires to obtain fuel 13 from a fueling station 10, he or she activates a fuel pump 12 via an actuator 14 to begin the fueling process. As shown in FIG. 1, the actuator 14 may comprise a handle on a fuel pump nozzle attached to the fuel pump 12 that the patron squeezes. In other embodiments, the actuator 14 may comprise a button that a patron pushes, or any other mechanism for starting and stopping the fueling process. Exemplary actuators 14 of the present disclosure may be referred to as "controllers" or as a "controller."

Activating the fuel pump 12 with the actuator 14 opens the conduit to a fuel source 15 (such as an underground or aboveground fuel storage tank) and effectively pulls fuel 13 therefrom or facilitates the general delivery of fuel 13 from the fuel source 15. As the fuel 13 flows from the fuel source 15 into the patron's vehicle or other receptacle, a metering device 16 located on the fuel pump 12 typically displays numbers (e.g., dollars/cents (or other currency) and gallons/liters (or other volume or unit of measurement)) that advance in accordance with the amount of fuel 13 dispensed. When the patron has the amount of the fuel 13 desired (based on the quantity of fuel 13 dispensed and/or on cost), he or she releases the handle of the nozzle (or otherwise deactivates pumping operation of the fuel pump 12 via the actuator 14), the flow of fuel 13 stops, and the conduit to the fuel source 15 is closed. As no more fuel 13 flows from the fuel source 15, the numbers on the display of the metering device 16 no longer advance and, thus, stop on particular numbers (usually corresponding with the amount owed for the fuel 13 and the quantity of fuel 13 dispensed).

The exemplary systems and methods disclosed herein implement a game out of or in connection with the above-referenced fueling process. Such a system or method may be referred to herein as "The Game." At least one object of the game is for the player/patron to stop the flow of fuel 13 (in the aforementioned embodiment, for example, by letting go of the handle for the first time (or another time) after initiating the flow) such that the meter number(s) stop on a desired dollar amount and/or volume amount. In the event the patron/player stops on the dollar and/or volume amount desired, the player is awarded a prize 30, or is considered for a prize 30 based upon at least this particular accomplishment, from the fueling station 10 or game administrator.

FIG. 1 also depicts components of an exemplary system/game 50 of the present disclosure. For example, and as shown in FIG. 1, an exemplary system/game 50 of the present disclosure comprises a fuel pump 12, a metering device 16 (also referred to as a controller), and any additional components referenced herein as may be desired.

It will be understood that, in addition to the various fueling station components previously described, the fuel pump 12 configured for operation in connection with the game of accuracy described herein may also comprise one or more output devices and/or one or more input devices 22 positioned thereon or in its general vicinity. For example, in at least one embodiment the fuel pump 12 comprises a display 18 and a device that produces sound, such as a speaker 20. These input devices may operate independently or in concert to provide information to patrons. In at least one embodiment, the display 18 and the speaker 20 operate together to produce lights, bells and whistles in the event a patron successfully plays the game and is awarded a prize 30, thereby notifying not just the winning patron, but any other patrons of the fueling station 10 that are in the immediate area. The fuel pump 12 may also comprise, or be operably coupled with, one or more processors 75 (such as a computer or components of a computer known or developed in the art, including, but not limited to, one or more of a traditional computer/computing processor, storage medium, memory, a disc drive, etc.) to facilitate various aspects of and execute the game. Such processing systems are known in the art and may be operable to receive, send, and store information, execute comparison algorithms or functions, and/or operate any other aspects of the game described herein.

Providing a player with an opportunity to win a valuable award is an important aspect of promoting and maintaining player interest in the game and it will be appreciated that the prize 30 structure and offerings are fully customizable. A display 18 on the fuel pump 12 may be used to display the available prizes 30 and/or other special offers awarded to players that are successful with the game, thereby providing incentive for patron participation. The prize 30 could be any type of benefit—for example, and without limitation, an immediate or future credit at the fueling station for fuel, services and/or merchandise, a percentage rebate on the fuel 13 purchased in connection with playing the game (e.g., ten percent (10%) cash back), cash, merchandise, fuel, free or discounted items from a related convenience store, a free car wash, or even free game play. The prize(s) 30 may be set by the game administrator or comprise a selection of offered awards from which the player may choose according to their preference. Furthermore, if more than one player participates in a single play of the game, any prizes 30 awarded may be split between the two players at either the game administrator's or the players' discretion. Furthermore, prize(s) 30 can be directed to a customer's rewards card or account (described in further detail below), for instances such as when the player is short on time and needs to skip the immediate trip inside the convenience store to redeem the prize 30, for example. The prize 30 could then be used at a later time. Additional prizes 30, for example, could be one or more entries into a larger drawing/raffle, for example, so that as the player accumulates points, rewards, and/or prizes 30, those items would either also accumulate as entries into a drawing or raffle, would be in connection with entries into the drawing or raffle, or would be entries themselves.

In at least one embodiment, the game comprises a prize 30 hierarchy—with low tier and high tier prizes 30. For example, in at least one embodiment, a player will be awarded a high tier prize 30 if he or she stops the fuel pump 12 on the goal amount/volume (i.e. the "goal outcome") exactly. However, low tier prizes 30 may be awarded in the event he or she does not stop the fuel pump 12 on the exact goal outcome, but within an allowed percentage of error. Furthermore, a fueling station 10 may organize the prize 30 structure such that the larger the player's goal outcome, the more valuable the available prize 30. For example, where a player selects a $10.00 goal outcome, the available prize 30 may only be a low tier prize 30; however, if the player selects a $60.00 goal outcome, the player may be eligible to win a high tier prize 30 (and, thus, more value). In this manner, game administrators can use the game to not only help drive customers to their fueling stations, but also facilitate the purchase of more fuel 13 per fueling.

Specific prize 30 structures may also be designed and implemented for the purpose of driving patrons into a store 11 associated with the fueling station 10. In at least one embodiment, a game administrator may designate certain shelves or aisles in the store 11 to prizes 30 associated with the game. For example, and without any limitation, a store 11 may have three dedicated sections of prizes 30, each associated with a different prize 30 level based on the goal outcome selected by the patron: (1) Section 1 for low tier prizes 30 associated with goal outcome set at less than or equal to $20.00; (2) Section 2 for mid-tier prizes 30 associated with goal outcomes set between $20.01 and $100.00; and (3) Section 3 for high tier prizes 30 associated with goal outcomes set equal to or greater than $100.00. Accordingly, if a patron selects a goal value of $100.01 and wins, she may select a high tier prize 30 from Section 3. In this manner, the different prizes 30 can be displayed to patrons of the store 11, thereby providing incentive to participate in the game. Furthermore, the prize 30 display allows winning patrons to browse the available prizes 30 and make their selections at their leisure.

It will be appreciated that, except as expressly set forth herein, any amount may be set as the goal amount or the goal outcome. For example, and without limitation, the goal outcome could be $20.00. Accordingly, if the player's first attempt at stopping the fuel pump 12 results in the meter 16 reading $20.00 exactly, the player wins a prize 30. In some embodiments, the player may not stop at $20.00 exactly, but may stop within an acceptable range, such as between $19.95 and $20.05, and still win a prize, which can be the same prize 30 or a lesser prize 30. In view of the same, various embodiments of the present disclosure can involve having a goal outcome, and an acceptable outcome range that encompasses the goal outcome. Alternatively, the goal outcome could be a quantity of fuel 13—e.g., 15 gallons of gasoline. The goal outcome could be set by the player via a keypad 22 or other input device prior to starting the pump 12 or, alternatively, by a game administrator or an attendant at the fueling station 10. Furthermore, in at least one embodiment, a processor (not shown) is used to set the goal outcome at random.

Conventionally, certain fuel pumps are designed with an automatic shut-off feature that generally acts to shut off the fuel pump when a predetermined amount of fuel 13 is dispensed (the "shut-off amount"). Many of these fuel pumps also act to slow down the metering of fuel 13 as the shut-off amount is approached. It will be appreciated that the disclosed game may be played on such fuel pumps as well, provided the goal outcome is set at a value that is less than the shut-off amount. For example, in at least one embodiment, a patron pre-pays for $20.00 worth of gasoline and desires to participate in the game. In such an example, the patron's goal outcome could be $19.00, or any other amount less than the dollar value and/or volume where the metering of the fuel 13 begins to slow. Accordingly, the player may attempt to win the game using the actuator 14 to stop the flow thereof for the first time in an attempt to stop the fuel pump 12 on a meter reading that is equivalent to the goal outcome. Thereafter, whether or not the player is successful at the game, the player can restart the fuel pump 12 to dispense the balance of the fuel 13 for which he or she has pre-paid (i.e., if the goal outcome was $19.00 and the player pre-paid $20.00, the balance of the fuel 13 remaining is $1.00 worth of gasoline). Accordingly, even where fuel pumps 12 are outfitted with automatic shut-off features, a game administrator can implement the game without the need for revamping any preexisting hardware and/or software associated with the fuel pump 12. Should older or less technologically advanced fuel pumps 12 be used, such as those without screens, those where software cannot be used to determine when a customer initially stops pumping, those that cannot print receipts, etc., information regarding the game could be affixed to and/or displayed at or near said fuel pumps 12 so that people can still play the game using an old pump. However, a game administrator may choose to remove or disable any automatic shut-off features on those fuel pumps 12 at the fueling station 10 designated for use in connection with the game in an effort to simplify game administration.

In yet another embodiment, the goal outcome may be set by both the fueling station 10/game administrator and the player. In at least one embodiment, the fueling station 10 provides a player with a series of goal outcome options. Here, the player selects the desired goal outcome prior to initiating play. For example, a fueling station 10 may provide a player the following series of goal outcome amounts to select from: $10, $20, $30, $40, $50, or $60. Thus, in this embodiment, the player may select any one of those values to set as the goal outcome for the game. As previously described, a game administrator may promote a player to pick a higher goal outcome by offering higher valued prizes 30 (i.e. a high tier prize) for those amounts (which would be an opportunity for an additional or increased sale). In general, the various games and systems referenced here help to increase market share, reduce or eliminate competition, increase a new customer base or loyalty, facilitate opening of new locations for fuel and retail products, and/or generally surpass the competition in various areas of sales and service.

In addition to the foregoing, the various games (based upon fuel 13 quantity dispensed and/or dollar amount) can be facilitated by using a store/loyalty card, a credit card formally or informally affiliated with the store/gas station, or another mechanism that identifies the pump user (or his or her designee) and that monitors and/or tracks usage in connection with pumping fuel 13 and/or the game embodiment(s) used. For example, a game administrator may establish a reward program such that each time a fueling station patron participates in the game of accuracy, he or she is awarded a point value on a rewards card assigned to that particular patron. At the game administrator's discretion, such reward points may be awarded whether or not the patron wins a prize 30 in connection with their play of the game. Accumulated reward points may be redeemed by the patron in exchange for prizes, cash, or any other incentive established by the game administrator or, alternatively, at the patron's discretion, stored in his or her rewards account (discussed below) for accumulation and later use. Accordingly, in addition to the prizes 30 associated with the game of accuracy disclosed herein, the accumulation of reward points may also provide incentive for a fueling station patron to participate in the game and repeatedly purchase fuel 13 and associated items from one particular fueling station 10.

As many conventional fueling stations currently employ loyalty or rewards cards in one fashion or another, it will be appreciated that the game of accuracy may be tied to a fueling station's existing rewards cards or have its own, dedicated rewards cards. In such an embodiment, the user may be required to enter the store 11 to sign up or register for the loyalty card and/or otherwise tie the user's method of payment (such as a debit, credit, or gift card, for example) to his or her participation in the game. Once formally registered and/or activated, the patron can obtain rewards or prizes, accumulate points, etc., on the loyalty card and/or in connection with the patron's method of payment. The loyalty card or method of payment can be used to activate the fueling game at the pump 12, for example, and any resulting rewards points will be automatically added to the applicable rewards account. Further, depending on the overall embodiment of the game structure, the patron may also be required to enter the store 11 to redeem rewards, discounts, and/or points and/or to obtain a prize 30. By doing so, the store 11 increases overall foot traffic therein, and the patron may be apt to purchase other items off the shelf (such as a soda, candy bar, hot dog, etc.), which benefits the store 11 by way of generating revenue and profit. The aforementioned elements/features may be used in one overall game structure, or portions thereof may be used in one or more game structures A patron who has registered for a rewards program or activated a rewards card offered by the game administrator in connection with the fueling game may access his or her rewards point balance via computer, through a fueling station attendant, or in any other manner that is known in the art. Additionally or alternatively, an output device located on the fuel pump 12 comprising a printer 24 may print a ticket for the patron displaying the number of rewards points such patron has accumulated in his or her rewards account. It will be appreciated that such output device can be the same printer 24 that produces receipts following a fuel transaction, or may be an independent output device. A game administrator can use such an output device located on the fuel pump 12 to also provide additional information or benefits to patrons including, without limitation, coupons or an inventory of past prizes 30 redeemed in connection with their game play at the fueling station 10 and the overall monetary value associated therewith.

Accordingly, the game and its components are fully customizable and the patron is presented with no risk in participating as he or she is not required to buy-in or otherwise pay-to-play. However, it will be appreciated that the game may alternatively be configured such that a patron must buy-in to participate. In such embodiment, it is contemplated that the prizes 30 offered may be more valuable so as to offset the increased risk to the player associated with the pay-to-play structure.

Furthermore, the game described herein may be provided to patrons via fuel pumps 12 in combination with additional games of accuracy or chance unrelated to the fueling process. In at least on embodiment, the fuel pump 12 is configured as described herein in connection with the described fueling game of accuracy and further comprises an additional display associated with a secondary game. For example, the secondary game may comprise a series of scroll displays that rotate or rearrange game symbols where the objective is to stop each scroll display on common symbols or in a particular pattern. Alternatively or additionally, winners of the fueling game of accuracy may be entered for a periodic drawing (i.e. game of chance) for a Grand Prize 30. In at least one embodiment, a game administrator may establish a secondary game of chance available to only those patrons who win the fueling game of accuracy with a goal outcome equal to a sufficient value (e.g., equal to or over $100.00) during an identified eligibility period (e.g., the first quarter of a year). Accordingly, following the end of the identified eligibility period, one winner is selected by chance from the entrants to win a grand prize 30. It will be appreciated that such additional games of accuracy and/or chance may be advertised on the displays of the fuel pumps 12 and in or around the fueling station 10 for promotional purposes, and will promote not only patron participation in the fueling game of accuracy, but also encourage individuals to purchase fuel 13 from the fueling station 12 rather than competitors. In various games or systems referenced herein, there could be one entry per play, and no specific prize 30 win would be required to enter into a larger drawing, raffle, or grand prize, for example. Should a customer exceed his or her entry limits, the customer could receive one or more entries into an additional drawing, which could be larger or less frequent than the other drawings, for example. Data from the customer (such as e-mail addresses, home addresses, phone numbers, etc.) can be obtained when the customer signs up for a rewards card, and that information could be used to provide various offers, promotions, discounts, etc., to the customer in attempt to drive more visits to the convenience store and fuel pump. Minimum purchases of fuel, for example, can be required to obtain an entry into a raffle or drawing, should a retailer wish to implement such a minimum.

While the fueling station may undergo some risk in that it will award prizes 30 to successful players, interest in the game will increase customer traffic to and interest in the fueling station 10. In order to hedge this risk, a game administrator could establish limits on the number and frequency of winners. By way of example, and without limitation, a fueling station 10 could establish that no more than four (4) participants may win high tier prizes 30 each hour. Furthermore, because of the customizable nature of this game, a game administrator can use the game to achieve desired effects. For example, a fueling station 10 could use the game to drive patrons inside an associated store 11 by awarding prizes 30 that must be redeemed behind the register. In this manner, a fueling station 10 could increase the likelihood that patrons will enter the store 11 and purchase high profit-margin items therein. Alternatively, for a fueling station 10 more interested in increasing traffic to its fuel pumps 12, the prizes 30 could be redeemable at the pump 12 itself, either as discounted fuel, a voucher code for a specified dollar amount, additional game play or secondary game entries, or otherwise.

Again, it will be appreciated that the fueling game is fully customizable such that a game administrator can change, modify, alter, remove and/or establish new conditions and/or rules for the game at any time. A game administrator could even exploit the customizable nature of the game to encourage interest therein. For example, by periodically changing the awards available, rules and/or game conditions, a game administrator could increase customer interest in the game (i.e. create demand) and, in so doing, drive an increased amount of traffic to the fueling station 10. In at least one embodiment, game administrators may continually move the fueling pump(s) 12 at which game play is available (each, a "Lucky Pump") so that patrons are not aware that they have selected to fuel 13 at a Lucky Pump until after they have committed to a specific fuel pump 12. As described above, such manufactured uncertainty can be used to promote customer interest, create demand and, ultimately, increase customer traffic to the fueling station 10 and associated store. Depending on the level of interest created in the fueling station 10 by the game, a fueling station 10 may desire to have a designated individual for monitoring patrons' game play and/or providing assistance in connection therewith as may be necessary or appropriate.

One non-limiting example of how a game administrator may implement and customize the game includes the adoption of a "Lotto Day" concept. For example, a game administrator can designate one or more days where every patron of the fueling station 10 has the opportunity to play the game in connection with their fueling purchase if they first come into the store 11 to indicate their desire to participate. In this embodiment, while all of the fuel pumps 12 of the fueling station 10 are configured for use in connection with game play, each must first be activated by the game administrator or fueling station attendant in order for a patron to participate in the fueling game thereon. Accordingly, similar to how most conventional fuel pumps must first be activated prior to dispensing fuel 13 (with such activation typically being dependent on payment preapproval), here, a fueling station attendant or game administrator may use a master switch to activate the fuel pump 12 for game play in the event a patron indicates their interest in the same.

Referring now to FIG. 2, a flow chart is shown that represents an exemplary embodiment of the present invention that may be performed at a fuel pump. The particular arrangement of elements in the flow chart of FIG. 2, as well as any other flow charts discussed herein, is not meant to imply a fixed order to the steps; rather, the steps can be practiced in any order that is practicable for various embodiments of the present invention.

In FIG. 2, a method 100 initiates at step 102 with prompting a fueling station patron to participate in the fueling game of accuracy described herein. This may be achieved in numerous ways. In an exemplary embodiment, prior to selecting what type of fuel 13 he or she wishes to purchase, at step 102 the patron is prompted via the visual display 18 on the fuel pump 12 as to whether or not they wish to participate in the game. Such display 18 may comprise flashing lights and graphics to attract a patron's attention and promote their interest in participating in the game. Additionally or alternatively, the patron may also be presented with a similar audible request via an output device (e.g., speaker 20) on the fuel pump 12. While such prompts may be used in connection with any fuel pump 12 configured for play of the fueling game of accuracy, they may be particularly useful when the game of accuracy is not available at every fuel pump 12 at the fueling station 10. For example, where the Lucky Pump (previously described) moves around to different fueling pumps 12 periodically or only a specified number of fueling pumps 12 are configured for use with the fueling game, visual and/or audible prompts delivered via one or more output devices are useful to inform patrons that they have selected a fuel pump 12 configured for game play and to prompt the patron at step 102 regarding their participation in the game. Alternatively, a game administrator may dedicate one or more fuel pumps 12, or even an island of fuel pumps 12, at a fueling station 10 to the game. In such embodiments, the prompting of a fuel pump patron at step 102 comprises signs and/or other advertising as to which fuel pump(s) 12 are designated for the game such that a patron knows to pull up to a certain fuel pump 12 in order to participate in the game. For example, a fueling station 10 may display an advertisement on the street notifying potential customers as to the availability of the fueling game and the location of the fuel pumps 12 configured for game play at the fueling station 10. In various embodiments, and should lines start to form at one or more game islands, for example, additional game islands could be opened to promote sales, promote service, and to improve the overall experience for the consumers.

If the fuel patron desires to participate in the game and responds accordingly, at step 104 a goal outcome is set. As previously described, the value of this goal outcome may be set by the game administrator, the player, or a combination of both (e.g., the player selects a goal outcome from a list of predefined selections set by the game administrator). In the event the goal outcome is set by the player (in whole or in part), the player provides the same via one or more input devices located on the fuel pump (e.g., keypad 22) and/or verbally to a fueling station attendant. Alternatively, a fueling station attendant, game administrator, or a processor may set the goal outcome, or the goal outcome may be set by the player with a fueling station attendant or at the fuel pump after pre-paying for fuel. In at least one embodiment, the fueling station attendant sets the goal outcome at the register and the value is transmitted to the appropriate fuel pump 12 via any communications means known in the art.

The player activates the fuel pump 12 at step 106, thereby advancing the meter display in accordance with the amount of fuel 13 dispensed. At step 108, the player deactivates the pump 12 via the actuator 14 with the object of dispensing only the amount of fuel 13 that corresponds with the goal outcome. The fuel pump 12, or a metering mechanism 16 thereon, evaluates the amount of fuel 13 dispensed by the player as evidenced by the meter reading (the "actual outcome") with respect to the goal outcome. Such evaluation may be performed by directly comparing the actual outcome with the goal outcome or through statistical analysis to determine how closely the goal outcome corresponds with the actual outcome. Furthermore, this evaluation may be performed by any means known in the art, including a manual comparison or through the use of a processor and related software. After it is determined whether or not the player is a winner, one or more output devices on the fuel pump 12 indicates the outcome of the game. Furthermore, regardless of whether the player wins or loses the game of accuracy, he or she may restart the fuel pump 12 to continue dispensing the desired amount of fuel. In various embodiments referenced herein, each player can be a winner, most players can be winners, or some players can be winners. For example, each player could win at least a discount coupon, accumulate rewards points, receive another type of reward, or a combination of two or more of the foregoing.

In an exemplary embodiment, if it is determined at step 108 that the amount of fuel 13 dispensed corresponds with the goal outcome, the one or more output devices on the fuel pump 12 indicates the same. For example, visual and/or audio displays 18, 20 may indicate that the player is a winner by flashing lights and sounding a congratulatory alarm such as bells and whistles. An audio device may also instruct the patron regarding prize 30 collection and/or redemption; for example, playing an audio recording that congratulates the patron on winning and indicates that his or her prize 30 may be redeemed inside the associated store 11. Furthermore, a printer device 24 on the fuel pump 12 may print a ticket for the player to present to the game administrator or fueling station attendant to redeem his or her prize 30. Additionally, if the patron has previously registered for a rewards program offered by the game administrator, such ticket may display the number of rewards points the patron has accumulated in his or her rewards account. Accordingly, if the player is a winner, at step 110 the player enters the store 11 and is awarded a prize, and rewards could be automatically rewarded at that time. It will be appreciated that this step 110 is beneficial for the game administrator in that it drives the patron into the store 11, thereby increasing the probability that such patron will make an additional purchase therein.

In yet another embodiment, as indicated by the dashed arrow of FIG. 2, a player can request a multiple play and thus repeat steps 106 and 108 before either concluding the game or, if a winner, advancing to step 110. Here, a game administrator sets a minimum amount of fuel 13 purchased in order to be eligible to play. In the event a player desires to dispense an amount of fuel 13 that is more than or equal to twice the designated minimum amount, the player can indicate they desire a multiple play. For example, and without limitation, the minimum amount may be set at $20.00. In this embodiment, should a player desire a double play, he or she indicates their desire to purchase more than or equal to $40.00 worth of fuel 13 and sets their first and second goal outcomes at step 104. For instance, their first goal outcome could be $20.00 and their second goal outcome could be $40.00. Thereafter, the player advances through steps 106 and 108 for the first round by activating the fuel pump 12 (step 106) and deactivating the fuel pump 12 (step 108) in an attempt to have the meter read their first goal outcome (in the aforementioned non-limiting example, $20.00). Irrespective of whether or not the player is successful in the first round, the game proceeds to the second round and back to step 106—i.e. the player reactivates the fuel pump 12 (step 106) and deactivates the fuel pump 12 (step 108) in an attempt to have the meter 16 read their second goal outcome (in the aforementioned non-limiting example, $40.00). After the specified number of rounds are played, the game concludes or, in the event the player was a winner in one or more of the rounds, advances to step 110.

It will be appreciated that any number of rounds may be played, provided the player satisfies the minimum amount set by the game administrator in each round. Furthermore, the goal outcome for each round need not comprise the same increments (e.g., in the aforementioned non-limiting example, both goal outcomes were in increments of $20.00). Indeed, where the fuel pump 12 comprises an automatic shut-off feature, it may be necessary for the goal outcome of the final round to be less than the previous goal outcome(s).

For example, and without limitation, in the aforementioned non-limiting example, the first goal outcome may be $20.00 and the second goal outcome may be $39.00 such that the second round of play does not run afoul of the automatic shut-off feature of the fuel pump.

In addition to the foregoing, where the fueling game is implemented in connection with one or more secondary games of chance or accuracy, method 100 may further comprise step 112. In at least one embodiment, if the winning patron satisfies the criteria established to participate in a secondary game (e.g., the goal outcome value was sufficient), the patron can elect to participate in a secondary game at step 112. For example, where the secondary game comprises a game of chance where entrants are selected at random for a Grand Prize, at step 112 the eligible patron indicates to the fueling station attendant or game administrator of his or her interest in entering the secondary game. Thereafter, the secondary game is implemented pursuant to the overall game structure established by the game administrator and any prizes 30 are awarded accordingly.

Figure 3:
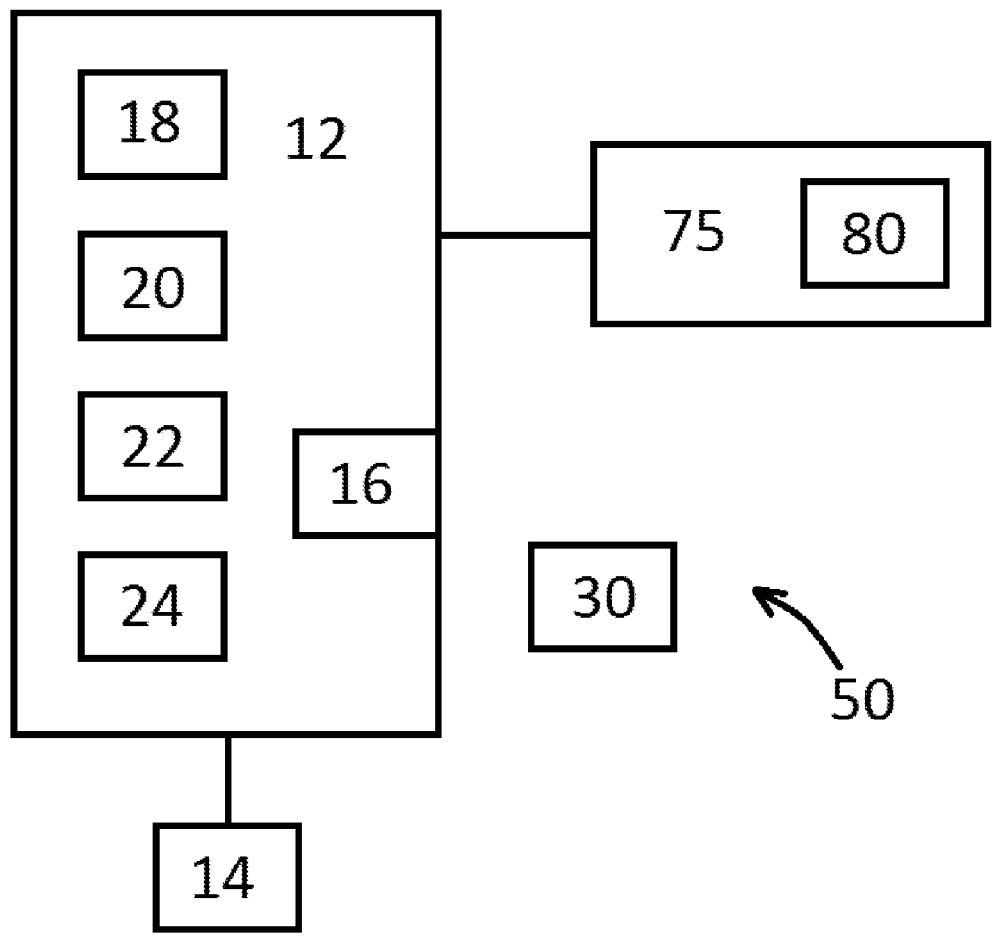
FIG. 3 shows a block component diagram of an exemplary system/game 50 of the present disclosure.

FIG. 3 shows a block component diagram of an exemplary system/game 50 of the present disclosure. As shown therein, an exemplary system/game 50 of the present disclosure comprises a fuel pump 12 and a metering device or controller 16, whereby metering device or controller 16 is in communication with processor 75, operable to perform software 80 instructions as referenced herein. Systems/games 50 of the present disclosure, as referenced herein, are configured to award one or more prizes 50, as shown in FIG. 3.

In addition to the foregoing, various system/game 50 embodiments of the present disclosure can be configured (set up) to offer larger prizes 30 when a customer makes larger purchases. For example, there may be 20 to 1 odds (or another odds amount) of someone winning using the gallons amount rather than trying to stop exactly on the dollar amount. Such a system/game 50 embodiment may have this additional feature as a selling point.

By way of example, a customer may arrive to the station and request the attendant to authorize $35.00 in fuel 13 on a particular pump. The attendant activates the lotto pump (pump 12), and pump 12 is authorized to pump $35.00 worth of fuel. The player can then play the game with the preauthorized amount of money rather than, for example, swiping a credit card at the pump.

In various examples, the player may have been provided with specific requirements, such as a timeline, for redeeming a particular prize 30.

Various systems/games 50 of the present disclosure operate by way of software 80. A processor 75 can operate to perform instructions within the software 80 in connection with game play as referenced herein.

In the U.S., traditional pumps display dollars and cents (with cents being two numbers after a decimal point), and fuel 13 quantity displayed in gallons (with quantities less than a gallon displayed as three numbers after a decimal point). As such, winning the game by landing exactly on a fuel 13 quantity amount would be more difficult than landing on a dollar amount. Various winning amounts or ranges can be used to account for level of difficulty. Also, various prize 30 values can be offered depending on winning a more difficult game.

An existing station 10 and/or store 11 could purchase and/or license system/game 50 components, such as processor 75 and/or software 80. Exemplary systems/games 50 of the present disclosure may further comprise one or more of a display 18, a speaker 20, an input device 22, an output device 24, and/or an actuator 14, as desired and as referenced herein.

In at least one embodiment, the player may desire a particular target that differs from the target offered by the attendant. For example, the player may desire to land on a particular dollar amount or within a dollar range, while the attendant at station 10, or system/game 50 itself, only offers a prize 30 if the player lands on a fuel 13 quantity amount or within a fuel 13 quantity range.

As referenced herein, sounds (such as through a speaker 20) can be played. In at least one example, music can be heard playing at the station 10, and a different sound, such as casino music/sounds, can be played when a player is playing the game. For example, and during game play a recording with casino sounds is played a bit louder by pressing a button. When a customer wins, the attendant presses a button that plays a recording of a jackpot being won, and the customer goes to the store 11 to collect his/her winnings. Others non-players can just pump the fuel they paid for and support the company game with their fuel purchases.

Another example identifies that different and higher-value prizes 30 may be available depending on how much money the player spends at the station 10. For example:

a. The customer pays $20.00 for fuel 13. The attendant can then ask the player if he or she wishes to play the game, and agrees to do so after being told the game play is free. The attendant can then write down a target on the receipt (such as 3 gallons of fuel, for example), and should the customer win, the customer comes back to validate the win and pick up his winnings (prize) he or she selects from the store 11.

b. The customer pays $50 toward a fill-up. The attendant can then provide the customer with a target (10 gallons, for example), and should the customer win, the customer can select from a specific group of prizes 30.

c. The customer pays $50.00 twice. The attendant tells the customer if he or she stops the pump exactly on 10 gallons the first time, the customer will win and have an opportunity to win a second prize 30.

d. The customer pays $100.00 or more and plays for one or more of the top prizes 30 at the store 11.

In various embodiments here, several people may play the game and not win. They also don't lose anything, and the profit on fuel 13 sales by the station 10 helps pay for the cost of the prizes 30.

Aside from the many general advantages noted above in connection with driving customer traffic to fueling stations and/or convenience stores that utilize systems and methods of the present disclosure, if a single brand/store is able to use the invention (also referred to as "The Game"), that brand/store would also reap the rewards of being able to offer to franchisees, for example, "The Game" that can be played at their fuel pumps and potentially only to fuel pumps under that particular brand or store. Should a potential franchisee seek out various brands, the franchisee would see the clear advantage to a brand that offers "The Game," and thus providing an advantage to that brand that is able to offer "The Game."

While various embodiments of the game and methods of facilitating play of the game have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A method for facilitating the play of a game of accuracy at a fuel pump, comprising the steps of:
   at least one player operating a system to dispense fuel or energy with the object of dispensing a specific quantity of the fuel or energy related to a goal outcome, the system comprising:
      a fuel pump having a metering mechanism operable to display a value corresponding to the quantity of fuel or energy dispensed from a source of the fuel or energy;
      a controller coupled with the fuel pump, the controller operable by the at least one player to start and stop distribution of the fuel or energy by the fuel pump; and
      a processor in communication with the metering mechanism, the processor operable to compare the goal outcome with the value displayed by the metering mechanism to determine of the at least one player should be awarded a prize; and
   providing a prize to the at least one player in the event the value corresponds with the goal outcome;
   wherein the step of providing the prize to the at least one player is performed by:
      assigning a point amount to the at least one player, the point amount corresponding to how closely the quantity of fuel or energy dispensed matches the goal outcome;
      designating at least one winning point amount corresponding to a number of points required to win the prize; and
      providing the prize to the at least one player in the event the point amount is equal to or greater than the at least one winning point amount.

2. The method of claim 1, wherein the goal outcome comprises a currency amount, and wherein the processor is operable to compare the currency amount with the value to determine if the prize should be awarded.

3. The method of claim 2, wherein the currency amount is selected from the group consisting of a single currency value and a range of currency values.

4. The method of claim 1, wherein the goal outcome comprises an amount of fuel or energy, and wherein the processor is operable to compare the amount of fuel or energy with the value to determine if the prize should be awarded.

5. The method of claim 4, wherein the amount of fuel or energy is selected from the group consisting of a single amount of fuel or energy and a range of amounts of fuel or energy.

6. The method of claim 1, wherein the goal outcome is selected by the at least one player.

7. The method of claim 1, wherein the goal outcome is not selected by the at least one player.

8. The method of claim 1, wherein the step of providing the prize is performed by:
   printing a prize ticket and dispensing the prize ticket to the at least one player; and providing the prize to the at least one player in response to the at least one player tendering the prize ticket for redemption.

9. The method of claim 1, wherein the prize is selected from a group of potential prizes.

10. The method of claim 9, wherein the group of potential prizes comprises at least one first prize having a first value and at least one second prize having a second value lower than the first value, and wherein the step of providing the prize is performed by selecting the prize from the group of potential prizes based upon how close the value is compared to the goal outcome.

11. The method of claim 1, further comprising the steps of:
providing the at least one player a secondary objective that corresponds with a second goal outcome; and
providing a second prize to the at least one player in the event the at least one player achieves the second goal outcome.

12. A method, comprising the steps of:
at least one player operating a system to dispense fuel or energy with the object of dispensing a specific quantity of the fuel or energy, the system comprising:
a fuel pump having a metering mechanism operable to display a value corresponding to the quantity of fuel or energy dispensed from a source of the fuel or energy;
a controller coupled with the fuel pump, the controller operable by the at least one player to start and stop distribution of the fuel or energy by the fuel pump; and
a processor in communication with the metering mechanism, the processor operable to compare the goal outcome with the value displayed by the metering mechanism to determine of the at least one player should be awarded a prize; and
providing a prize to the at least one player in the event the value corresponds with the goal outcome;
wherein the goal outcome either a) comprises a currency amount, wherein the processor is operable to compare the currency amount with the value to determine if the prize should be awarded, or b) outcome comprises an amount of fuel or energy, and wherein the processor is operable to compare the amount of fuel or energy with the value to determine if the prize should be awarded;
wherein the prize is indicated on a ticket printed from a printer in communication with the processor; and
wherein the step of providing the prize to the at least one player is performed by:
assigning a point amount to the at least one player, the point amount corresponding to how closely the quantity of fuel or energy dispensed matches the goal outcome;
designating at least one winning point amount corresponding to a number of points required to win the prize; and
providing the prize to the at least one player in the event the point amount is equal to or greater than the at least one winning point amount.

13. The method of claim 12, wherein the prize is selected from a group of potential prizes, wherein the group of potential prizes comprises at least one first prize having a first value and at least one second prize having a second value lower than the first value, and wherein the step of providing the prize is performed by selecting the prize from the group of potential prizes based upon how close the value is compared the goal outcome.

14. The method of claim 12, wherein the goal outcome comprises a currency amount, and wherein the processor is operable to compare the currency amount with the value to determine if the prize should be awarded.

15. The method of claim 12, wherein the goal outcome comprises an amount of fuel or energy, and wherein the processor is operable to compare the amount of fuel or energy with the value to determine if the prize should be awarded.

16. A method for facilitating the play of a game of accuracy at a fuel pump, comprising the steps of:
at least one player operating a system to dispense fuel or energy with the object of dispensing a specific quantity of the fuel or energy related to a goal outcome, the system comprising:
a fuel pump having a metering mechanism operable to display a value corresponding to the quantity of fuel or energy dispensed from a source of the fuel or energy;
a controller coupled with the fuel pump, the controller operable by the at least one player to start and stop distribution of the fuel or energy by the fuel pump; and
a processor in communication with the metering mechanism, the processor operable to compare the goal outcome with the value displayed by the metering mechanism to determine of the at least one player should be awarded a prize; and
providing a prize to the at least one player in the event the value corresponds with the goal outcome;
wherein the step of providing the prize to the at least one player is performed by:
assigning a point amount to the at least one player, the point amount corresponding to how closely the quantity of fuel or energy dispensed matches the goal outcome;
designating at least one winning point amount corresponding to a number of points required to win the prize; and
providing the prize to the at least one player in the event the point amount is equal to or greater than the at least one winning point amount;
wherein the goal outcome comprises a currency amount, and wherein the processor is operable to compare the currency amount with the value to determine if the prize should be awarded; and
wherein the goal outcome is not selected by the at least one player.

17. The method of claim 16, wherein the goal outcome comprises a currency amount, and wherein the processor is operable to compare the currency amount with the value to determine if the prize should be awarded.

18. The method of claim 17, wherein the currency amount is selected from the group consisting of a single currency value and a range of currency values.

19. The method of claim 16, wherein the goal outcome comprises an amount of fuel or energy, and wherein the processor is operable to compare the amount of fuel or energy with the value to determine if the prize should be awarded.

20. The method of claim 19, wherein the amount of fuel or energy is selected from the group consisting of a single amount of fuel or energy and a range of amounts of fuel or energy.

* * * * *